United States Patent
Carney

(10) Patent No.: US 9,276,804 B2
(45) Date of Patent: Mar. 1, 2016

(54) SYSTEMS AND METHODS FOR BROADBAND BACKUP

(71) Applicant: MasterCard International Incorporated, Purchase, NY (US)

(72) Inventor: Kevin S Carney, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 420 days.

(21) Appl. No.: 13/781,994

(22) Filed: Mar. 1, 2013

(65) Prior Publication Data

US 2014/0247709 A1 Sep. 4, 2014

(51) Int. Cl.

| H04L 12/24 | (2006.01) |
|---|---|
| H04L 29/14 | (2006.01) |
| H04L 12/703 | (2013.01) |
| G06Q 20/08 | (2012.01) |
| G06Q 20/42 | (2012.01) |
| G06Q 20/38 | (2012.01) |
| H04L 12/723 | (2013.01) |
| H04L 12/707 | (2013.01) |
| G06Q 20/00 | (2012.01) |

(52) U.S. Cl.
CPC ............ *H04L 41/0654* (2013.01); *G06Q 20/00* (2013.01); *G06Q 20/08* (2013.01); *G06Q 20/382* (2013.01); *G06Q 20/425* (2013.01); *H04L 41/0663* (2013.01); *H04L 45/22* (2013.01); *H04L 45/28* (2013.01); *H04L 45/50* (2013.01); *H04L 69/40* (2013.01)

(58) Field of Classification Search
None
See application file for complete search history.

(56) References Cited

U.S. PATENT DOCUMENTS

| 7,274,654 | B2 | 9/2007 | Yang et al. | |
|---|---|---|---|---|
| 7,406,032 | B2 | 7/2008 | Li et al. | |
| 8,208,371 | B2 | 6/2012 | Li et al. | |
| 8,311,045 | B2 | 11/2012 | Quinn et al. | |
| 8,316,435 | B1 | 11/2012 | Varadhan et al. | |
| 8,374,077 | B2 | 2/2013 | Li et al. | |
| 2005/0237925 | A1* | 10/2005 | Taylor et al. | 370/216 |
| 2006/0015450 | A1* | 1/2006 | Guck et al. | 705/39 |

(Continued)

FOREIGN PATENT DOCUMENTS

KR 20050020422 A 3/2005

OTHER PUBLICATIONS

International Search Report and Written Opinion, dated May 20, 2014, for co-pending International Application No. PCT/US2014/016525 (11 pgs).

*Primary Examiner* — Ashley Shivers
(74) *Attorney, Agent, or Firm* — Armstrong Teasdale LLP

(57) ABSTRACT

A method and system for providing a payment network via a plurality of multiprotocol label switching networks using a network interface device are provided. The method includes receiving, a first network message containing financial transaction data from a first one of a plurality of multiprotocol label switching networks, determining a destination of the financial transaction data from the network message, transmitting the financial transaction data to a second one of the plurality of multiprotocol label switching networks using a second network containing the financial transaction data, where at least one of the first one and the second one of the plurality of multiprotocol label switching networks is an Internet-based network that provides back-up access for transmitting the financial transaction data between a payment card interchange network and at least one of an issuer bank and a merchant bank using a Generic Routing Encapsulation (GRE) tunnel inside an IPSec connection.

20 Claims, 6 Drawing Sheets

(56) References Cited

U.S. PATENT DOCUMENTS

| | | |
|---|---|---|
| 2008/0048025 A1 | 2/2008 | Fitzgerald et al. |
| 2009/0022099 A1 | 1/2009 | Ra et al. |
| 2009/0225650 A1 | 9/2009 | Vasseur |
| 2010/0177631 A1 | 7/2010 | Chen et al. |
| 2011/0238596 A1* | 9/2011 | Giordano et al. ............. 705/400 |
| 2011/0276446 A1* | 11/2011 | Gupta et al. .................... 705/34 |
| 2012/0243407 A1 | 9/2012 | Li et al. |

* cited by examiner

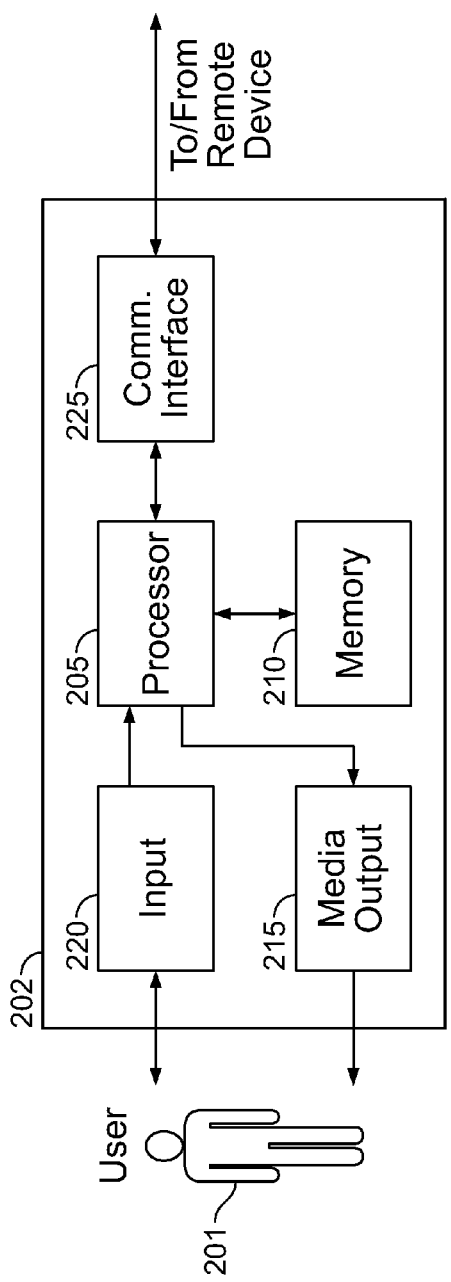
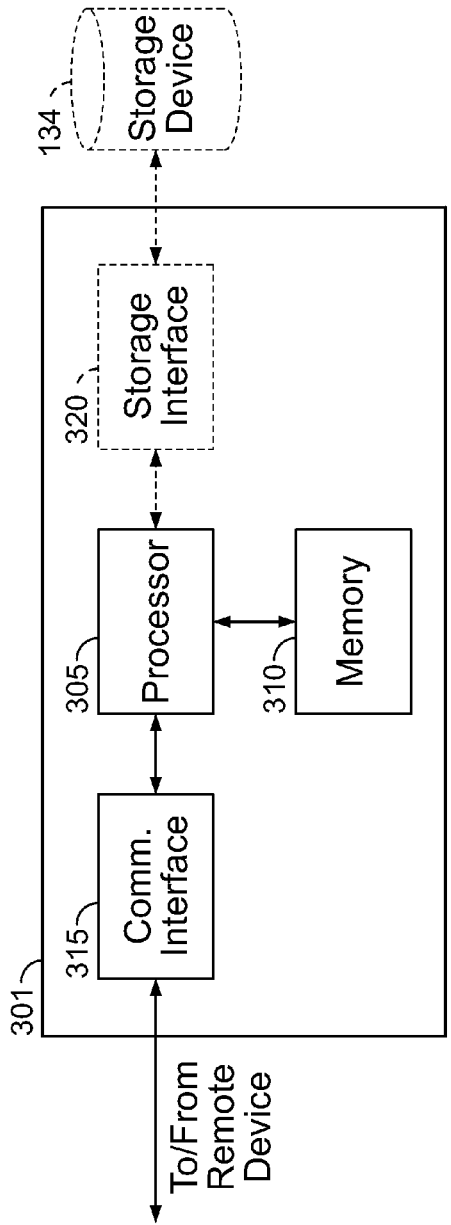

SYSTEMS AND METHODS FOR BROADBAND BACKUP

BACKGROUND OF THE INVENTION

The field of the invention relates generally to methods and systems for network communications and, more particularly, to methods and systems for routing communications through parallel networks.

At least some known payment card interchange networks rely primarily on terrestrial network segments to pass data between network endpoints. For example, a known network may include copper wire lines, fiber optic lines, microwave relays, and the like. Such physical infrastructures are susceptible to network failures, especially in areas or regions where such physical infrastructure is lacking.

An approved standard design uses either ISDN or analog dials to provide for redundant access to the production payment card interchange network. Each provider has a dial connection used for the redundant link. On a dual router sites this connection terminates on the second router and on single router sites both connections are on the same router. The customer redundant access then terminates at a regional concentration point for access. Each dial router then connects to the regional NNI routers to permit access connectivity to a multiprotocol label switching (MPLS) network. The on-demand dial design is not always up and connected. As used herein, the term customer may refer to merchant 24, merchant bank 26, issuer 30, and/or any party that needs to be connected to the payment card interchange network 28 through a communications processor, such as a MIP. Without limiting the generality of the foregoing, it is contemplated that the typical customer will be merchant bank 26 also referred to as the acquirer bank.

Alternatives to the currently approved connection methods are required to address the connectivity needs in emerging markets as well as the changing "last mile" access landscape in the existing markets. Limitations with existing backup technologies like lack of bandwidth; high cost; or regional availability to dial access have created risks to providing fully redundant access. Also some technologies are being phased out and being replaced by a secure access over the public Internet.

BRIEF DESCRIPTION OF THE INVENTION

In one aspect, a multiple network bridge system includes a first network device that is coupled to a first service provider network, a second network device that is coupled to a second service provider network, a third network device that facilitates communication between the first network and the second network and is communicatively coupled to a payment card interchange network located remotely from the multiple network bridge system, and a fourth network device that is coupled to the Internet through a firewall, wherein the fourth network device is coupled to said third network device such that said fourth network device is capable of communicating with said first and second network devices.

In another aspect, a computer-based method for providing a payment network via a plurality of multiprotocol label switching networks wherein the method is implemented using a network interface device including a processor coupled to a memory device includes receiving, at the network interface device, a first network message containing financial transaction data from a first one of a plurality of multiprotocol label switching networks, determining a destination of the financial transaction data from the network message, transmitting the financial transaction data to a second one of the plurality of multiprotocol label switching networks using a second network containing the financial transaction data, where at least one of the first one and the second one of the plurality of multiprotocol label switching networks is an Internet-based network that provides back-up access for transmitting the financial transaction data between a payment card interchange network and at least one of an issuer bank and a merchant bank using a Generic Routing Encapsulation (GRE) tunnel inside an IPSec connection.

In yet another aspect, one or more non-transitory computer-readable storage media has computer-executable instructions embodied thereon, wherein when executed by at least one processor, the computer-executable instructions cause the processor to receive a first network message containing financial transaction data from a first one of a plurality of multiprotocol label switching networks, determine a destination of the financial transaction data from the network message, transmit the financial transaction data to a second one of the plurality of multiprotocol label switching networks using a second network containing the financial transaction data, detect a failure of the first network connection, advertise a backup access to direct peers of the first network, and re-establish the connection through the backup access, where at least one of the first one and the second one of the plurality of multiprotocol label switching networks is an Internet-based network.

BRIEF DESCRIPTION OF THE DRAWINGS

FIGS. 1-7 show exemplary embodiments of the methods and systems described herein.

FIG. 1 is a schematic diagram illustrating an exemplary multi-party payment card industry system for enabling ordinary payment-by-card transactions in which merchants and card issuers do not necessarily have a one-to-one relationship.

FIG. 2 is a simplified block diagram of an exemplary system including a plurality of computer devices in accordance with one example embodiment of the present invention.

FIG. 3 is an expanded block diagram of an exemplary embodiment of a server architecture of the system including the plurality of computer devices in accordance with one example embodiment of the present invention.

FIG. 4 illustrates an exemplary configuration of a client system shown in FIGS. 2 and 3.

FIG. 5 illustrates an exemplary configuration of a server system shown in FIGS. 2 and 3.

FIG. 6 is a schematic diagram of a communication network that may be used with multi-party transaction card industry system shown in FIG. 1 and/or payment card interchange network.

FIG. 7 is an expanded schematic block diagram of payment card interchange network shown in FIG. 1 in accordance with an exemplary embodiment of the present disclosure.

DETAILED DESCRIPTION OF THE INVENTION

Figure 1:
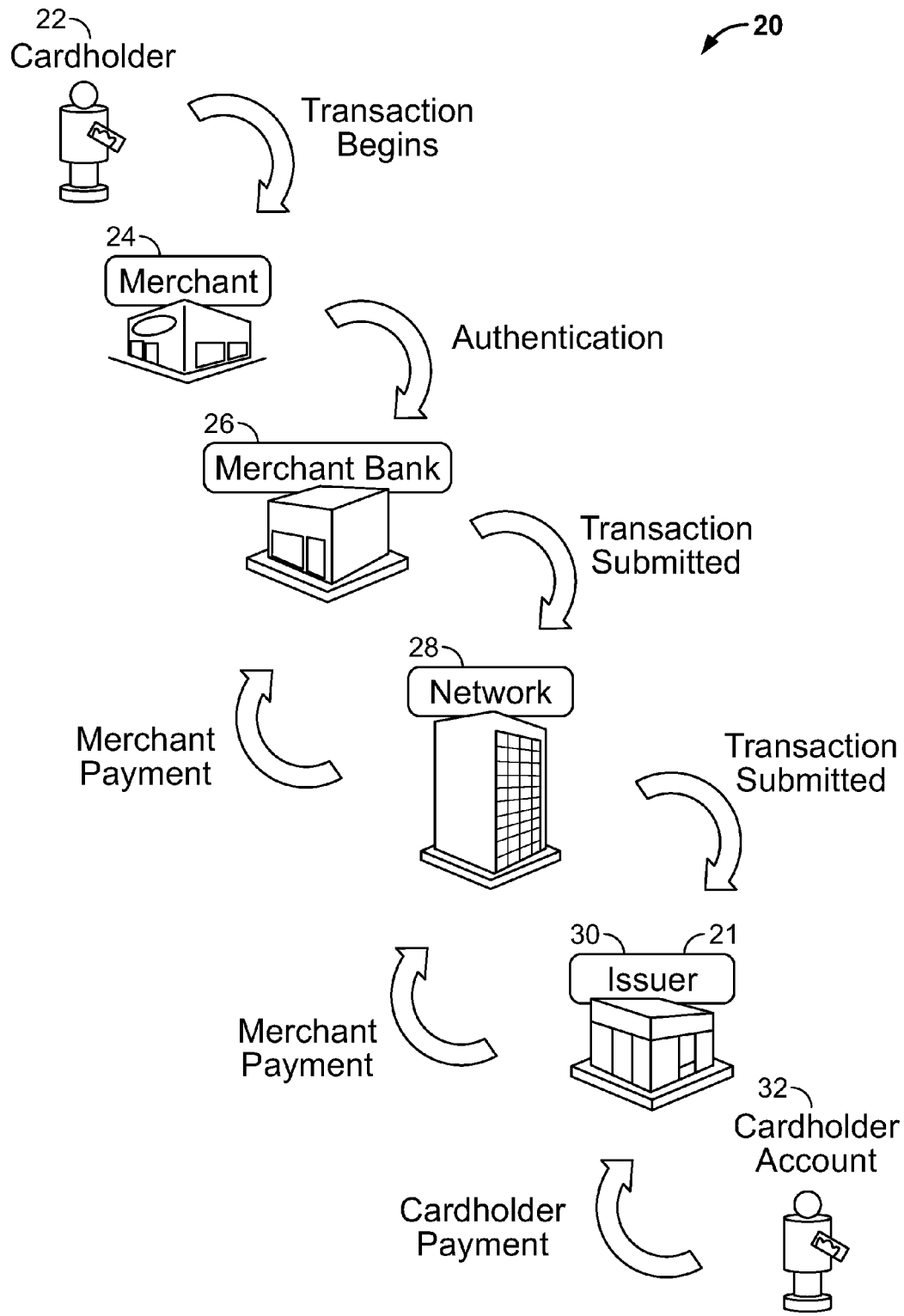

Embodiments of the present invention provide methods and systems for routing communications through parallel networks for backing-up existing networks. Existing payment card interchange networks rely primarily on terrestrial networks to connect network endpoints. Network-to network interfaces (NNI) may be used to facilitate extending such existing networks using other networks. As described in more detail herein, a system and method is provided for using an alternative backup option using the public Internet for customer connectivity to a payment card interchange network, such as the MasterCard Worldwide Network (MCWN). As used herein, the NNI is a network device configured to facilitate communications between a plurality of networks such as multiprotocol label switching (MPLS) networks.

The global reach of the Internet is an attractive solution in providing a backup access to the MCWN. The Internet can provide technology alternative to the MPLS solution for greater redundancy. Any new or legacy last mile access technology can be used in providing access to the Internet. This would include DSL, Wireless, Cable and leased line as possible options.

Expansion of the payment card interchange network to emerging markets includes challenges in providing reliable network access using the existing approved last mile technologies in those regions. To allow growth into these markets new standard access methods are described herein.

As new "last mile" technologies are developed in the telecommunication industry the legacy connection methods will be phased out. This is already the case for ISDN in some countries. While ISDN is available in many developed regions it is being phased out in favor of DSL. ISDN will continue to be available in some areas of the world, but to provide backup access in other regions, a new design that supports alternative access methods is described. Last mile access technologies that would normal not be supported could be used over the Internet as a backup to a customer primary MPLS circuit to MCWN.

The Internet backup solution provides diversity in circuit and technology access to customer sites. Because of the public nature of the Internet backup solution a requirement for firewalls, that are not currently required, at most customer service delivery point (SDP) is introduced. As used herein, the phrase "member SDP", or simply "SDP", refers to a "service delivery point" and may be used interchangeably with "customer network unit." An SDP is the network-provider managed endpoint. Firewalls will provide both an encryption termination point for an Internet Protocol Security (IPSec) connection and access security to the Internet. The Internet backup solution provides redundant access for customer sites where a Generic Routing Encapsulation (GRE) tunnel inside an IPSec connection is used to connect to the regional NNI site. The GRE tunnel allows for dynamic routing access the Internet. As used herein, Internet Protocol Security (IPsec) is a protocol suite for securing Internet Protocol (IP) communications by authenticating and encrypting each IP packet of a communication session. IPsec also includes protocols for establishing mutual authentication between agents at the beginning of the session and negotiation of cryptographic keys to be used during the session. Generic Routing Encapsulation (GRE) is a tunneling protocol developed by Cisco Systems, Inc. that can encapsulate a wide variety of network layer protocols inside virtual point-to-point links over an Internet Protocol internetwork.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g. balance checking), bill payments, achievement of targets (meeting account balance goals, paying bills on time), and/or product registrations (e.g. mobile application downloads).

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is a schematic diagram illustrating an exemplary multi-party transaction card industry system 20 for enabling ordinary payment-by-card transactions in which merchants 24 and card issuers 30 do not need to have a one-to-one special relationship. Embodiments described herein may relate to a financial transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical financial transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using a payment card interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment card interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, payment card interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 22 purchases travel, such as airfare, a hotel stay, and/or a rental car, at least partial itinerary information is transmitted during the clearance process as transaction data. When payment card interchange network 28 receives the itinerary information, payment card interchange network 28 routes the itinerary information to database 120.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and payment card interchange network 28, and then between payment card interchange network 28 and merchant bank 26, and then between merchant bank 26 and merchant 24.

Figure 2:
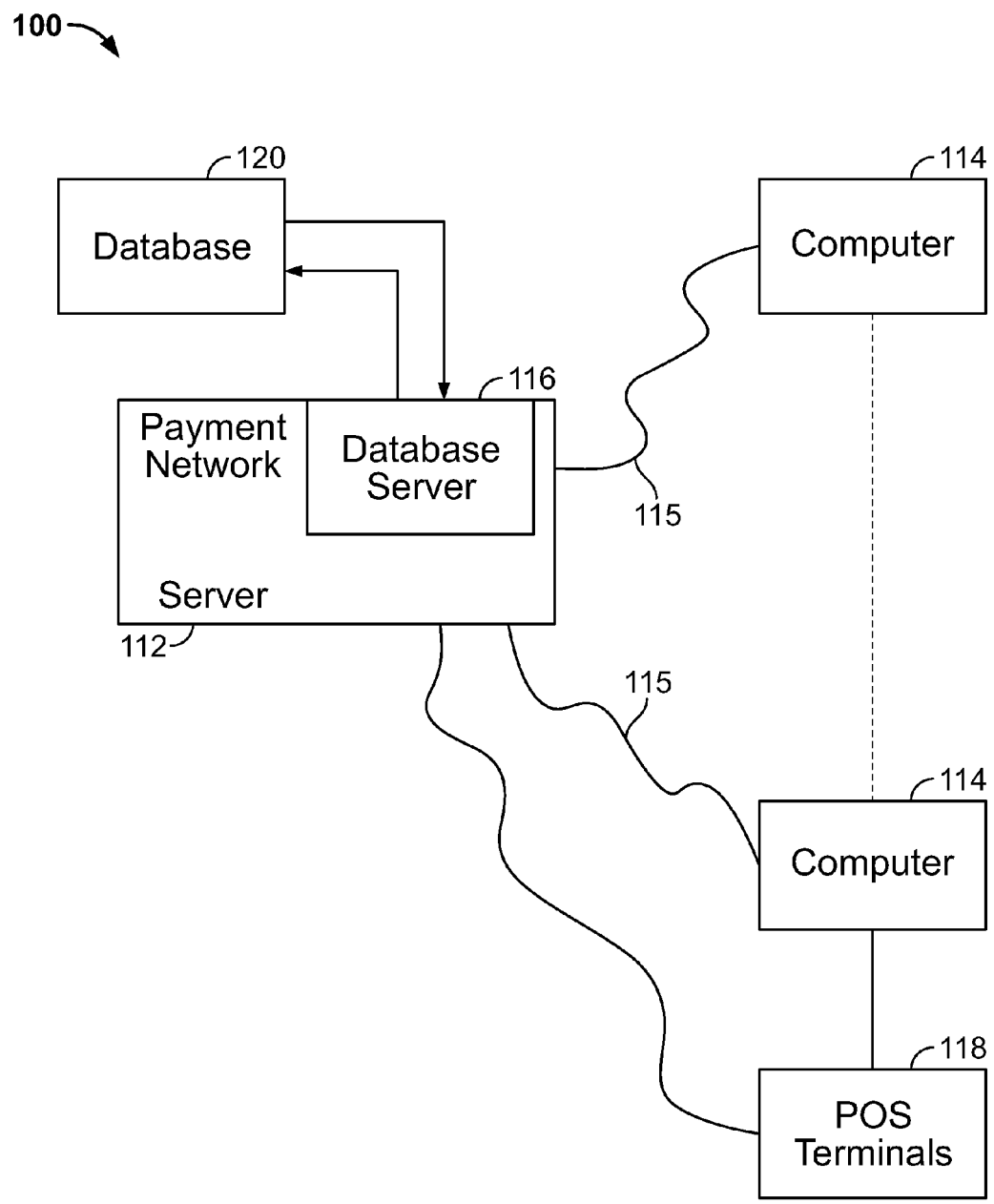

FIG. 2 is a simplified block diagram of an exemplary processing system 100 including a plurality of computer devices connected in communications using one or more NNI devices. In the example embodiment, system 100 may be used for performing payment-by-card transactions received as part of processing the financial transaction.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the exemplary embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with payment card interchange network 28. In the exemplary embodiment, server system 112 is associated with a network interchange, such as payment card interchange network 28, and may be referred to as an interchange computer system. Server system 112 may be used for processing transaction data. In addition, client systems 114 and/or POS terminal 118 may include a computer system associated with at least one of an online bank, a bill payment outsourcer, an acquirer bank, an acquirer processor, an issuer bank associated with a transaction card, an issuer processor, a remote payment system, and/or a biller.

Using payment card interchange network 28, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3:
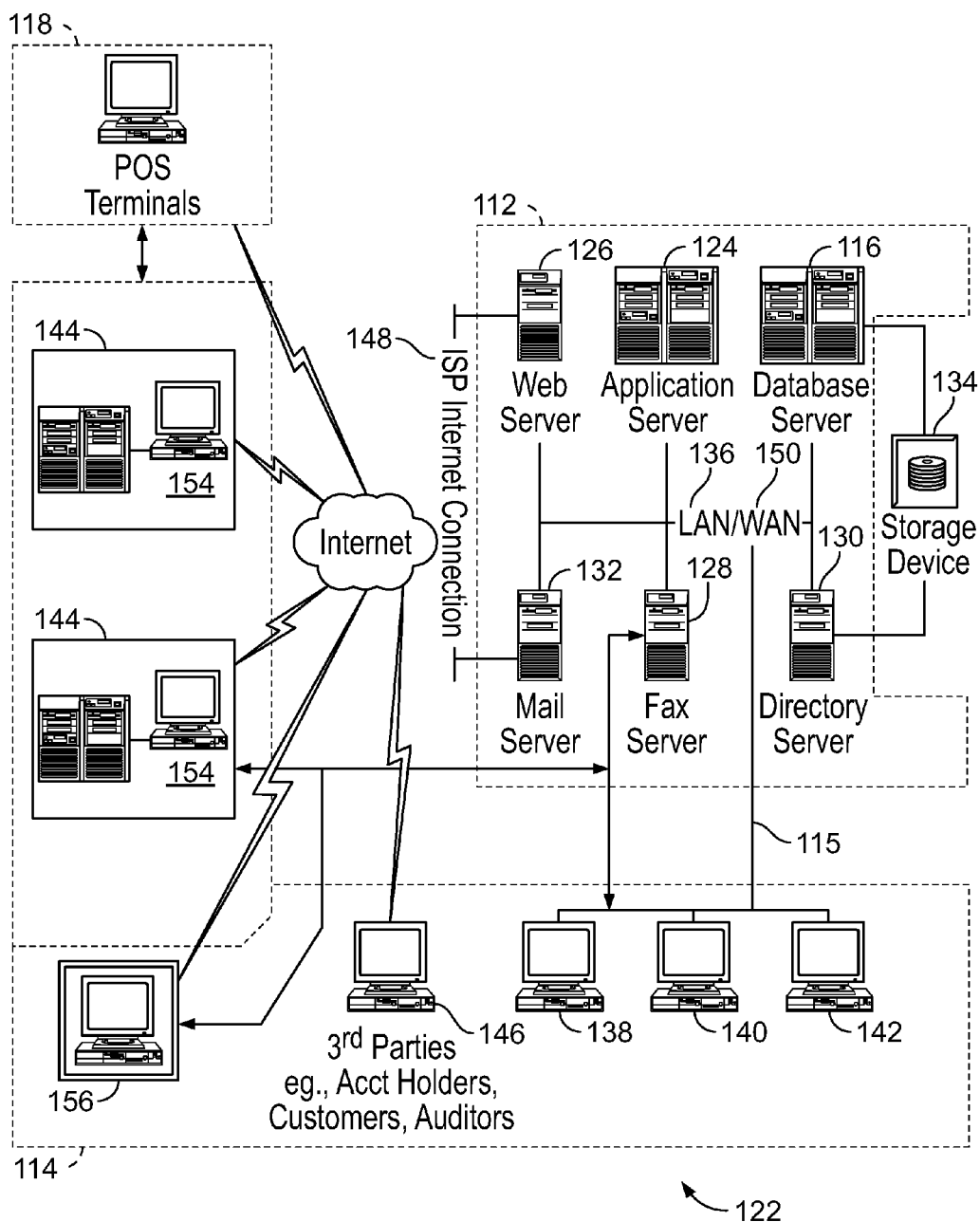

FIG. 3 is an expanded block diagram of an exemplary embodiment of a server architecture of a processing system 122 including other computer devices in accordance with one embodiment of the present invention. Components in system 122, identical to components of system 100 (shown in FIG. 2), are identified in FIG. 3 using the same reference numerals as used in FIG. 2. System 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. In various embodiments, network connection 115 includes a broadband back-up connection, which allows the payment network associated with server system 112 to connect with acquirer bank 26 and/or issuer bank 30 (shown in FIG. 1) by using a communication link connection to the public Internet through additional firewalls between the payment network and acquirer bank 26 and/or issuer bank 30. Alternatively, workstations 138, 140, and 142 are coupled to LAN 136 through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

FIG. 4 illustrates an exemplary configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the exemplary embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

FIG. 5 illustrates an exemplary configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
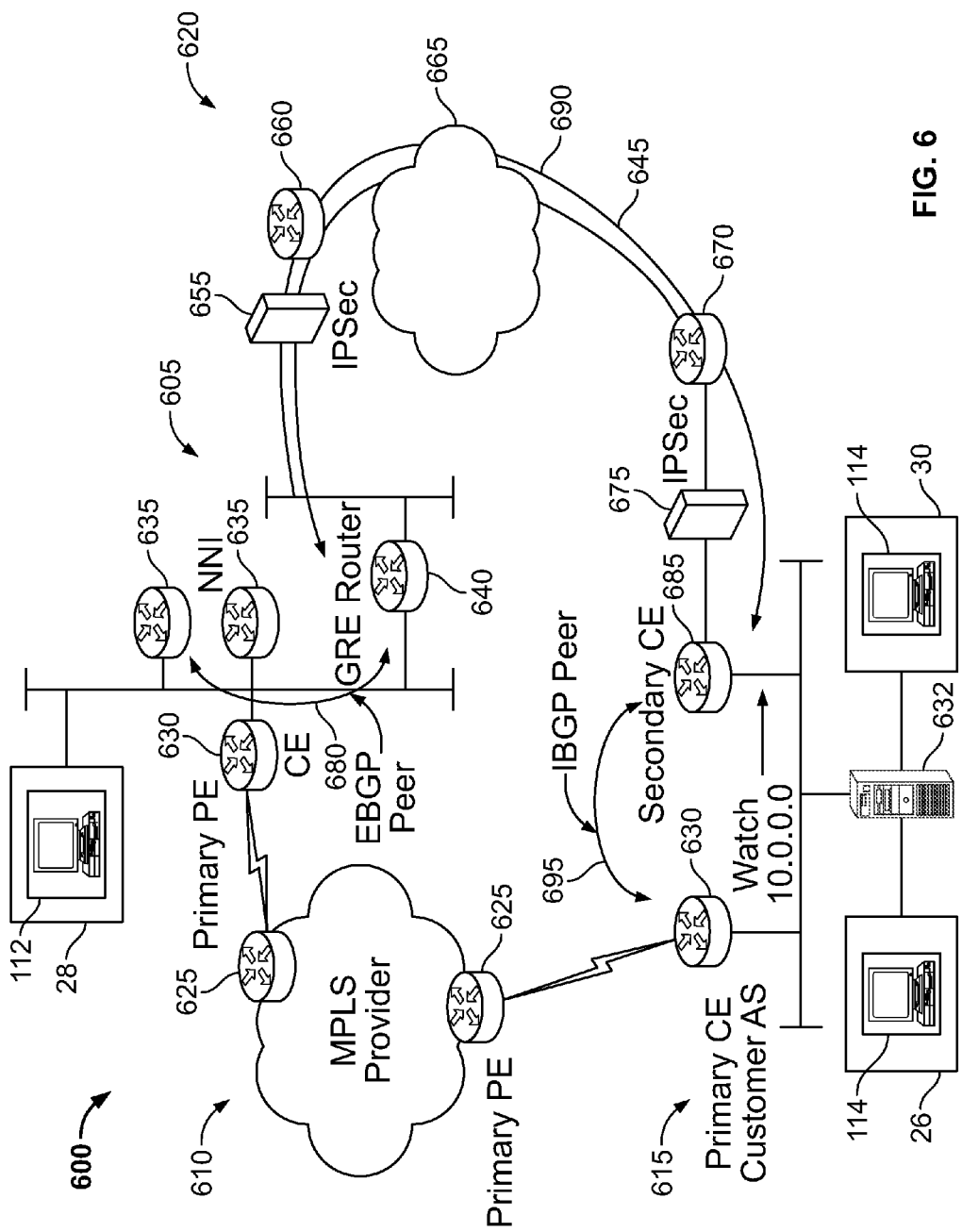

FIG. 6 is a schematic diagram of a communication network 600 that may be used with multi-party transaction card industry system 20 (shown in FIG. 1) and/or payment card interchange network 28. In the exemplary embodiment, network 600 includes a network to network interface (NNI) 605, one or more multiprotocol label switching (MPLS) networks 610, a customer network 615, and a broadband backup network 620. In various embodiments, a satellite network (not shown in FIG. 6 may also provide at least some of the functionality of broadband backup network 620 during operation of broadband backup network 620 or when broadband backup network 620 is not operational. It should be appreciated that NNI 605 may link customer network 615 with broadband backup network 620 and/or MPLS network 610. In the exemplary embodiment, broadband backup network 620 is used when MPLS network 610 is unavailable. For example, broadband backup network 620 may be used before customer network 615 is connected to MPLS network 610. Alternatively, or additionally, broadband backup network 620 may be used as a secondary, or backup, link if customer network 615 is unable to reach NNI 605 via MPLS network 610. Broadband backup network 620 may also be used as a primary link between customer network 615 and NNI 605.

MPLS network 610 includes at least one provider edge (PE) router 625 that is connected to a corresponding customer edge (CE) router 630. NNI 605 may be linked to more than one MPLS network 610 and NNI 605 may be configured to route data traffic between or among the more than one MPLS network 610. More particularly, NNI 605 may include at least one CE router 630 for each connected MPLS network 610. NNI 605 may include at least one router 635 configured to forward data traffic from a first MPLS network, such as MPLS network 610, to a second MPLS network (not shown) via the corresponding CE router(s) 630. Alternatively, CE router 630 may be configured to forward traffic bound for a different MPLS network 610 to the corresponding CE router 630.

Customer network 615 includes a communications processor 632. In the exemplary embodiment, communications processor 632 is a MASTERCARD INTERFACE PROCESSOR™ or MIP™ (trademarks of MasterCard International, Inc., of Purchase, N.Y.). Processor 632 is configured to communicate with server system 112 of payment network 28 for processing payment transactions. Processor 632 may be located at and/or utilized by at least one of acquirer bank 26 and issuer bank 30.

NNI 605 is linked to broadband backup network 620 via a router 640 that is capable of creating a GRE tunnel, such as GRE tunnel 645. Broadband backup network 620 may include, a first firewall 655, a first Internet router 660, the Internet 665, a second Internet router 670, and a second firewall 675. When used as a primary link, broadband backup network 620 may provide a contention ratio of 1:1 for customer network 615. When used as a secondary link, broadband backup network 620 may provide a higher contention ratio, e.g. 1:5, 1:10, 1:20, 1:50, etc., for customer network 615.

GRE tunnel 645 is used to connect customer network 615 with NNI 605. In the exemplary embodiment, GRE tunnel 645 is created using broadband backup network 620. Alternatively, or additionally, GRE tunnel 645 may be created using any other network, such as the Internet. Border gateway protocol (BGP) may be used across GRE tunnel 645 for routing. BGP conditional advertising may be used to introduce customer network 615 if the primary link, i.e., MPLS network 610, is unusable. A BGP community string may be used to identify the networks passed over the secondary link, i.e., broadband backup network 620 or the Internet. A BGP autonomous system (AS) number may be prepended for identifying the secondary link as a learned route. Static routing may be used to connect NNI 605 with router 640 and/or broadband backup network 620. Broadband backup network 620 may provide a tunnel destination route, e.g., following RFC1918. In the exemplary embodiment, router 640 is capable of supporting policy maps, class maps, prefix lists, and an access control list (ACL) specific to broadband backup network 620.

External BGP (EBGP) peers 680 may be established between router 640 and router(s) 635 for passing customer network 615 as a secondary, or backup, connection. NNI 605 may advertise customer network 615 using BGP. To allow for a redundant path, BGP conditional advertisement may be used. A BGP peer route-map entry may be used to filter traffic such that only predetermined traffic is sent to GRE router 640. A BGP peer "distribute-list" may be used to limit the learned routes from GRE router 640. The distribute-list may deny all routes from GRE router 640. It should be appreciated that BGP timers may need to be set sufficiently high to allow for transmission delays associated with transmission via broadband backup network 620.

GRE tunnel 645 may connect to CE router 630 on customer network 615 or a second CE router 685 on customer network 615. EBGP peers 690 may be established at endpoints of GRE tunnel 645, e.g., router 640 and router 685, or router 640 and router 630 on customer network 615. Using BGP conditional advertising, customer network 615 may be advertised over GRE tunnel 645. A watched router for BGP conditional advertising may be in the 10.0.0.0/8 network. In the exemplary embodiment, GRE tunnel 645 endpoint on customer network 615, e.g. router 630 or router 685, is capable of supporting route maps, policy maps, class maps, prefix lists, and an ACL. Accordingly, quality of service (QoS) may be enforced over GRE tunnel 645. In customer networks 615 with second router 685, an internal BGP (IBGP) peer session 695 may be established between router 630 on customer network 615 and router 685 in order to pass the 10.0.0.0/8 watched network. A static route may be used for egress access that points to GRE tunnel 645. GRE keepalives may be used on GRE tunnel 645.

Communication network 600 includes an IPSec Internet connection from the customer SDP 615 to a regional NNI site. The customer network uses firewalls to support the IPSec and access control to the Internet. The only traffic permitted to the firewall from the Internet is the IPSec connection. The connections access control on the firewall will then permit GRE tunnel between the SDP router 630 or 685 and router 640 at the NNI site that is used to terminate these tunnels. The customer SDP also uses a connection to a Tier 1 Internet service provider (ISP).

Dynamic routes are sent over GRE tunnel 645 using BGP. To emulate dial on demand backup connection, conditional BGP advertisement of routes will be used between the SDP and the NNI GRE router. Loss of a default route will trigger BGP to advertise the LAN network to the GRE router at the regional NNI sites.

Regional NNI sites also use firewalls to support terminating the IPSec connection and access control. Along with the firewall security devices two routers provide direct access to the Internet and the second will be used to terminate the GRE tunnel that connects the SDP to the NNI site. The NNI site also uses a connection to a Tier 1 ISP.

During operation, normal traffic flow is between the customer CE and the providers PE. If a primary link, e.g., a link from customer network 615 to MPLS network 610, were to fail, data (e.g., application traffic) normally transmitted over router 630 will instead be transmitted via router 685. The application running within the SDP will follow the path to the default gateway. With a dual router site if Hot Standby Router Protocol (HSRP) is tracking the WAN interface or a route, the default gateway is changed to the R2 router 685. As used herein, HSRP establishes a framework between network routers in order to achieve default gateway failover if the primary gateway becomes inaccessible. Data transmitted to router 685 will be encapsulated in GRE tunnel 645 between customer network 615 and NNI 605. In the exemplary embodiment, the connection is encrypted in an IPSec tunnel between the customer SDP and the NNI Firewall. Data in GRE tunnel 645 is transmitted via second Internet router 670 to Internet 665 for forwarding to first firewall 655 via first Internet router 660. IPSec is decrypted, e.g., using first firewall 655, before it is passed to router 640. Router 640 de-encapsulates GRE tunnel 645 and forwards the data from GRE tunnel 645 to router(s) 635 for forwarding to appropriate destinations, e.g., using MPLS network 610. On router 685, a statically-assigned default route, i.e., 0.0.0.0/0, may point to the IP address of GRE tunnel 645 at NNI 605. More particularly, when the link to MPLS network 610 fails, BGP will no longer see the watched 10.0.0.0 network and will trigger BGP to forward customer network 615 traffic to router 685. Router 685 may also forward the advertised customer network 615 to NNI 605 for forwarding, e.g., to CE router 630 within NNI 605. More particularly, customer network 615, GRE tunnel 645 interfaces, and router loopback addresses may be advertised. It should be appreciated that customer network 615 routes may be advertised only when the link between customer network 615 and MPLS network 610 fails.

With a WAN failure at the customer site, BGP will no longer see the default 10.0.0.0 network and will trigger BGP to forward the LAN route of the customer to the GRE router. The GRE router will then also forward the customer advertised network to the NNI router where the NNI would then pass to the providers CE. Access from MPLS will then follow the route to NNI site and the GRE router to be passed to the customer LAN.

Figure 7:
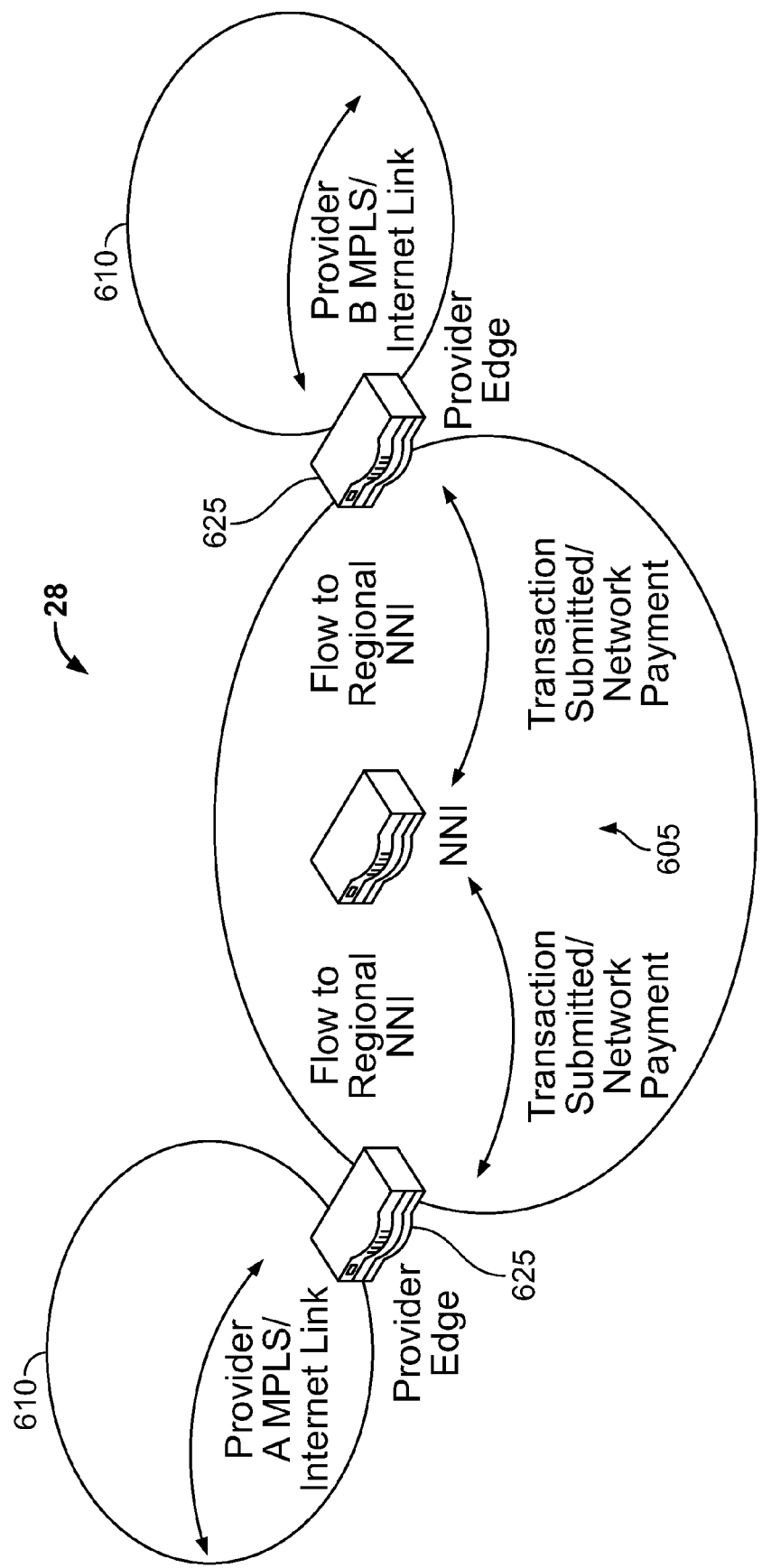

FIG. 7 is an expanded schematic block diagram of payment card interchange network 28 (shown in FIG. 1) in accordance with an exemplary embodiment of the present disclosure. In the exemplary embodiment, payment card interchange network 28 includes network to network interface (NNI) 605, which is implemented to facilitate providing an interface between MPLS networks, providing regional summary to drive local transactions to regional NNIs to reduce latency for real-time transactions, provide customers with redundant access connected to regional NNIs to also reduce latency for real-time transactions, determining application type and setting QoS for the provider MPLS networks, and verifying ownership of the transaction or network packet.

During operation, a merchant requests transaction authorization using communications through MPLS 610 provided by one of provider A or B or a satellite link. Payment card interchange network 28 processes the authorization request and replies with a payment authorization through MPLS 610 provided by another one of provider A or B or an Internet link.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is at least one of (a) receiving, at the network interface device, a first network message containing financial transaction data from a first one of a plurality of multiprotocol label switching networks, (b) determining a destination of the financial transaction data from the network message, and (c) transmitting the financial transaction data to a second one of the plurality of multiprotocol label switching networks using a second network containing the financial transaction data, where at least one of the first one and the second one of the plurality of multiprotocol label switching networks is an Internet-based network that provides back-up access for transmitting the financial transaction data between a payment card interchange network and at least one of an issuer bank and a merchant bank using a Generic Routing Encapsulation (GRE) tunnel inside an IPSec connection. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of network configuration provide a cost-effective and reliable means for providing back-up access between a financial transaction card interchange network and an issuer bank or a merchant bank. As a result, the methods and systems described herein facilitate maintaining a connection of customers to existing networks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A multiple network bridge system comprising:
    a first network device that is coupled to a first service provider multiprotocol label switching (MPLS) network and configured to route financial transaction authorization requests from a merchant to a payment card interchange network and financial transaction authorization responses from the payment card interchange to the merchant;
    a second network device that is coupled to a second service provider Internet-based network and configured to route the financial transaction authorization requests from the merchant to the payment card interchange network and the financial transaction authorization responses from the payment card interchange to the merchant when said first service provider MPLS network is unavailable or when enforcing Quality of Service;
    a third network device that facilitates communication between the first service provider network and the second service provider network and is communicatively coupled to the payment card interchange network located remotely from the multiple network bridge system; and
    a fourth network device that is coupled to the Internet through a firewall, wherein the fourth network device is coupled to said third network device such that said fourth network device is capable of communicating with said first and second network devices.

2. The system of claim 1, wherein the multiple network bridge system is communicatively coupled to a payment card interchange network and at least one of an issuer bank and a merchant bank.

3. The system of claim 1, wherein the multiple network bridge system is communicatively coupled to a payment card interchange network and at least one of an issuer bank and a merchant bank through a first multiprotocol label switching (MPLS) network and through a second Internet-based network.

4. The system of claim 1, wherein a communication between the first service provider network and the second service provider network is monitored for failure and wherein upon failure the communication is routed through the fourth network device.

5. The system of claim 1, wherein said firewall provides an encryption termination point for an Internet Protocol Security (IPSec) connection.

6. The system of claim 1, wherein said firewall provides access security to the Internet.

7. The system of claim 1, wherein said second service provider network comprises an Internet -based network.

8. The system of claim 1, wherein said second service provider network provides redundant access between a payment card interchange network and at least one of an issuer bank and a merchant bank through a Generic Routing Encapsulation (GRE) tunnel inside an IPSec connection.

9. The system of claim 1, wherein each of said first network device and said second network device monitor communications between the first service provider network and the second service provider network for Quality of Service (QoS).

10. The system of claim 1, wherein said first service provider network comprises a multiprotocol label switching network.

11. A computer-based method for providing a payment network via a plurality of multiprotocol label switching networks, the method implemented using a network interface device including a processor coupled to a memory device, the method comprising:
receiving, at the network interface device, a first network message containing financial transaction data from a first one of a plurality of multiprotocol label switching networks;
determining a destination of the financial transaction data from the network message;
transmitting the financial transaction data to a second physically separate one of the plurality of multiprotocol label switching networks using a second network message containing the financial transaction data, where
at least one of the first one and the second one of the plurality of multiprotocol label switching networks is an Internet-based network that provides back-up access for transmitting the financial transaction data between a payment card interchange network and at least one of an issuer bank and a merchant bank using a Generic Routing Encapsulation (GRE) tunnel inside an IPSec connection.

12. The computer-based method of claim 11, further comprising monitoring a communication between the first one of the plurality of multiprotocol label switching networks and the second one of the plurality of multiprotocol label switching networks for failure and wherein upon failure the communication is routed through the Internet-based network.

13. The computer-based method of claim 11, wherein transmitting the financial transaction data comprises transmitting the financial transaction data using at least one of the first one of the plurality of multiprotocol label switching networks and the second one of the plurality of multiprotocol label switching networks to provide redundant access between a payment card interchange network and at least one of an issuer bank and a merchant bank through a Generic Routing Encapsulation (GRE) tunnel inside an IPSec connection.

14. The computer-based method of claim 11, further comprising setting Quality of Service (QoS) settings that permit intelligent routing of communications through multiprotocol label switching networks between network endpoints.

15. The computer-based method of claim 11, further comprising detecting a failure of the at least one of the first one of the plurality of multiprotocol label switching networks and the second one of the plurality of multiprotocol label switching networks and advertising a backup access to direct peers of the failed network.

16. The computer-based method of claim 11, wherein at least one of the plurality of multiprotocol label switching networks is an always-up Internet-based network.

17. One or more non-transitory computer-readable storage media having computer-executable instructions embodied thereon, wherein when executed by at least one processor, the computer-executable instructions cause the processor to:
receive a first network message containing financial transaction data from a first one of a plurality of multiprotocol label switching networks;
determine a destination of the financial transaction data from the network message;
transmit the financial transaction data to a second one of the plurality of multiprotocol label switching networks using a second network message containing the financial transaction data,
detect a failure of the first network connection;
advertise a backup access to direct peers of the first network; and
re-establish the connection through the backup access, where
at least one of the first one of the plurality of multiprotocol label switching networks and the second one of the plurality of multiprotocol label switching networks is an Internet-based network.

18. The computer-readable storage media of claim 17, wherein the computer-executable instructions further cause the processor to monitor communications between the first one of the plurality of multiprotocol label switching networks and the second one of the plurality of multiprotocol label switching networks for Quality of Service (QoS).

19. The computer-readable storage media of claim 17, wherein the computer-executable instructions further cause the processor to set Quality of Service (QoS) settings that permit intelligent routing of communications through multiprotocol label switching networks between network endpoints.

20. The computer-readable storage media of claim 17, wherein the computer-executable instructions further cause the processor to provide the back-up access between a payment card interchange network and at least one of an issuer bank and a merchant bank through a Generic Routing Encapsulation (GRE) tunnel inside an IPSec connection.

* * * * *